United States Patent
Chen et al.

(12) 
(10) Patent No.: US 10,797,580 B1
(45) Date of Patent: Oct. 6, 2020

(54) DETECTION CIRCUIT, SWITCHING REGULATOR HAVING THE SAME AND CONTROL METHOD

(71) Applicant: Alpha and Omega Semiconductor (Cayman), Ltd, Grand Cayman (KY)

(72) Inventors: Bu-Wei Chen, Zhubei (TW); Yueh-Ping Yu, Zhubei (TW); Jung-Pei Cheng, Zhubei (TW)

(73) Assignee: ALPHA AND OMEGA SEMICONDUCTOR (CAYMAN), LTD., Grand Cayman (KY)

( * ) Notice: Subject to any disclaimer, the term of this patent is extended or adjusted under 35 U.S.C. 154(b) by 0 days.

(21) Appl. No.: 16/453,137

(22) Filed: Jun. 26, 2019

(51) Int. Cl.
*H02M 1/08* (2006.01)
*H02M 3/158* (2006.01)
*H02M 1/00* (2006.01)

(52) U.S. Cl.
CPC ......... *H02M 1/083* (2013.01); *H02M 3/1588* (2013.01); *H02M 2001/0009* (2013.01); *H02M 2001/0058* (2013.01)

(58) Field of Classification Search
CPC ............... H02M 3/1588; H02M 1/083; H02M 2001/0009; H02M 2001/0058
USPC ........ 323/222, 224, 235, 239, 271, 282–289
See application file for complete search history.

(56) References Cited

U.S. PATENT DOCUMENTS

| | | | |
|---|---|---|---|
| 7,030,596 B1* | 4/2006 | Salerno | H02M 3/158 323/282 |
| 7,072,198 B2* | 7/2006 | Krug | H02M 3/156 323/224 |
| 7,977,926 B2* | 7/2011 | Williams | H02M 3/1582 323/223 |
| 2010/0052629 A1* | 3/2010 | Chu | H02M 3/1588 323/239 |
| 2012/0119715 A1* | 5/2012 | Loikkanen | H02M 3/1582 323/235 |
| 2017/0353112 A1* | 12/2017 | Eum | H05B 45/44 |
| 2019/0123653 A1* | 4/2019 | Michal | H02M 3/1588 |

\* cited by examiner

*Primary Examiner* — Yemane Mehari
(74) *Attorney, Agent, or Firm* — Chen-Chi Lin

(57) ABSTRACT

A detection circuit for detecting an inductor current flowing through an inductor is provided. The inductor is coupled to a switch. The detection circuit includes a comparison circuit and a signal generating circuit. The comparison circuit, having a first node, is configured to compare a conduction time of a diode of the switch with a time threshold to provide a first voltage at the first node. The signal generating circuit, coupled to the first node, is configured to output a first detection signal according to the first voltage. The first detection signal indicates whether the inductor current flowing through the inductor reaches a first current threshold. A switching regulator comprises the detection circuit. A control method controls the switching regulator.

20 Claims, 14 Drawing Sheets

DETECTION CIRCUIT, SWITCHING REGULATOR HAVING THE SAME AND CONTROL METHOD

FIELD OF THE INVENTION

This invention relates generally to a current detection circuit, a switching regulator comprising the current detection circuit, and a control method of the switching regulator. More particularly, the present invention relates to a detection circuit for detecting an inductor current flowing through an inductor that is approaching zero current.

BACKGROUND OF THE INVENTION

Power converters can operate in different modes or scenarios. For example, a power converter can operate in a continuous conduction mode (CCM) at relatively heavy loads. In the CCM, an inductor current of the power converter (e.g. a current flowing or passing through an inductor) may not fall to zero. The power converter can deliver a large load current. Under light load conditions, the power converter can operate in a discontinuous conduction mode (DCM) to supply a low load current. As operating at light loads, e.g. a standby mode, most of the time, a portable device usually utilizes a power converter supporting the DCM.

SUMMARY OF THE INVENTION

A detection circuit, a switching regulator and a control method of a switching regulator are disclosed. The detection circuit is used for detecting an inductor current flowing through an inductor approaching zero current, The inductor is coupled to a switch node. The detection circuit includes a comparison circuit and a signal generating circuit. The comparison circuit, having a first node, is configured to compare a conduction time of a diode of the switch with a time threshold to provide a first voltage at the first node. The signal generating circuit, coupled to the first node, is configured to output a first detection signal according to the first voltage. The first detection signal indicates whether the inductor current flowing through the inductor reaches a first current threshold.

The switching regulator includes a switch and a detection circuit. The switch is coupled to an inductor and controlled by a drive signal. The detection circuit, coupled to the switch, is configured to generate the drive signal. The detection circuit includes a comparison circuit, a signal generating circuit and a drive circuit. The comparison circuit, having a first node, is configured to compare a conduction time of a diode of the switch with a time threshold to selectively adjust a charge accumulated at the first node. The signal generating circuit, coupled to the first node, is configured to output a first detection signal according to a first voltage at the first node. The first detection signal indicates whether an inductor current flowing through the inductor reaches a current threshold. The drive circuit is coupled to the switch and the signal generating circuit. When the detection signal indicates that the inductor current reaches the current threshold that is very close to zero current to avoid unnecessary power loss, the drive circuit is configured to output the drive signal according to the first detection signal, and turn off the switch according to the drive signal.

A control method of a switching regulator is disclosed. The switching regulator has a switch coupled to an inductor. The control method includes: comparing a conduction time of a body diode of the switch with a time threshold to adjust a voltage; comparing a ramp voltage with the adjusted voltage to generate a control signal; when the control signal indicates that the ramp voltage reaches the adjusted voltage, generating a detection signal indicating that an inductor current flowing through the inductor reaches a current threshold; and turning off the switch according to the detection signal.

With the use of a time threshold for a body diode conduction time, the auto-tuning detection scheme can adaptively and automatically adjust a turn-on time of a synchronous switch, thereby adjusting the body diode conduction time to approach or equal the time threshold to approach zero current detection to substantially zero ampere in a few switching cycles. The switch can be turned off at a suitable or optimal time, thus reducing conduction loss in a body diode of the switch. In addition, the auto-tuning detection scheme can be implemented as an analog control scheme, which uses a small die area or silicon area as compared with a digital control scheme.

DETAILED DESCRIPTION OF THE INVENTION

It will be understood that when an element is referred to as being "connected to" or "coupled to" another element, it may be directly connected to or coupled to the other element, or intervening elements may be present.

A power converter can utilize zero current detection (ZCD) to reduce potential reverse inductor current occurring in DCM operation. Accuracy of ZCD would affect efficiency and performance of the power converter in the DCM operation. For example, turning off a low-side switch of a switching regulator too early will steer or direct an inductor current to flow through a body diode of the low-side switch, resulting in relatively great conduction loss. As another example where the low-side switch is turned off too late, an inductor current may flow through a body diode of a high-side switch of the switching regulator, thereby increasing conduction loss in the body diode of the high-side switch. In addition, to enhance power conversion efficiency and reduce power consumption, the switching regulator usually utilizes a switch having a relatively low turn-on resistance. However, a slight deviation from a predetermined ZCD voltage across such switch may cause a considerable error in ZCD. By way of example, in some cases where the switch is implemented by a metal-oxide-semiconductor field-effect transistor (MOSFET) having a drain-source on-resistance Rds(on) of 1 mΩ, a 1 mV deviation from the predetermined ZCD voltage can introduce a relatively great current of approximately 1 ampere (A).

One approach to reducing body diode conduction loss can use digital circuit(s) to control a switch in a power converter, for example but is not limited to, a low-side switch or a synchronous switch. However, such approach may inevitably increase complexity of circuit design.

The present disclosure describes exemplary detection circuits for detecting an inductor current flowing or passing through an inductor. The present disclosure describes exemplary detection circuits for detecting a current flowing through a switch which is coupled to an inductor. With the aid of a time threshold, the detection circuit can adaptively, or automatically, tune operation thereof to determine a suitable or optimal switching timing of the switch in a power converter.

For example, when applied to ZCD for a switching regulator, the detection circuit can generate a detection signal by performing auto-tuning current detection according to a target time for a body diode conduction time of the switching regulator. The detection signal can relatively accurately indicate that an inductor current reaches a zero current level. The present disclosure further describes exemplary switching regulators, which include auto-tuning detection circuit(s). In addition, the present disclosure describes exemplary control methods of switching regulators. The control methods can realize high-accuracy ZCD to thereby control the switching regulators. Further description is provided below.

Figure 1:
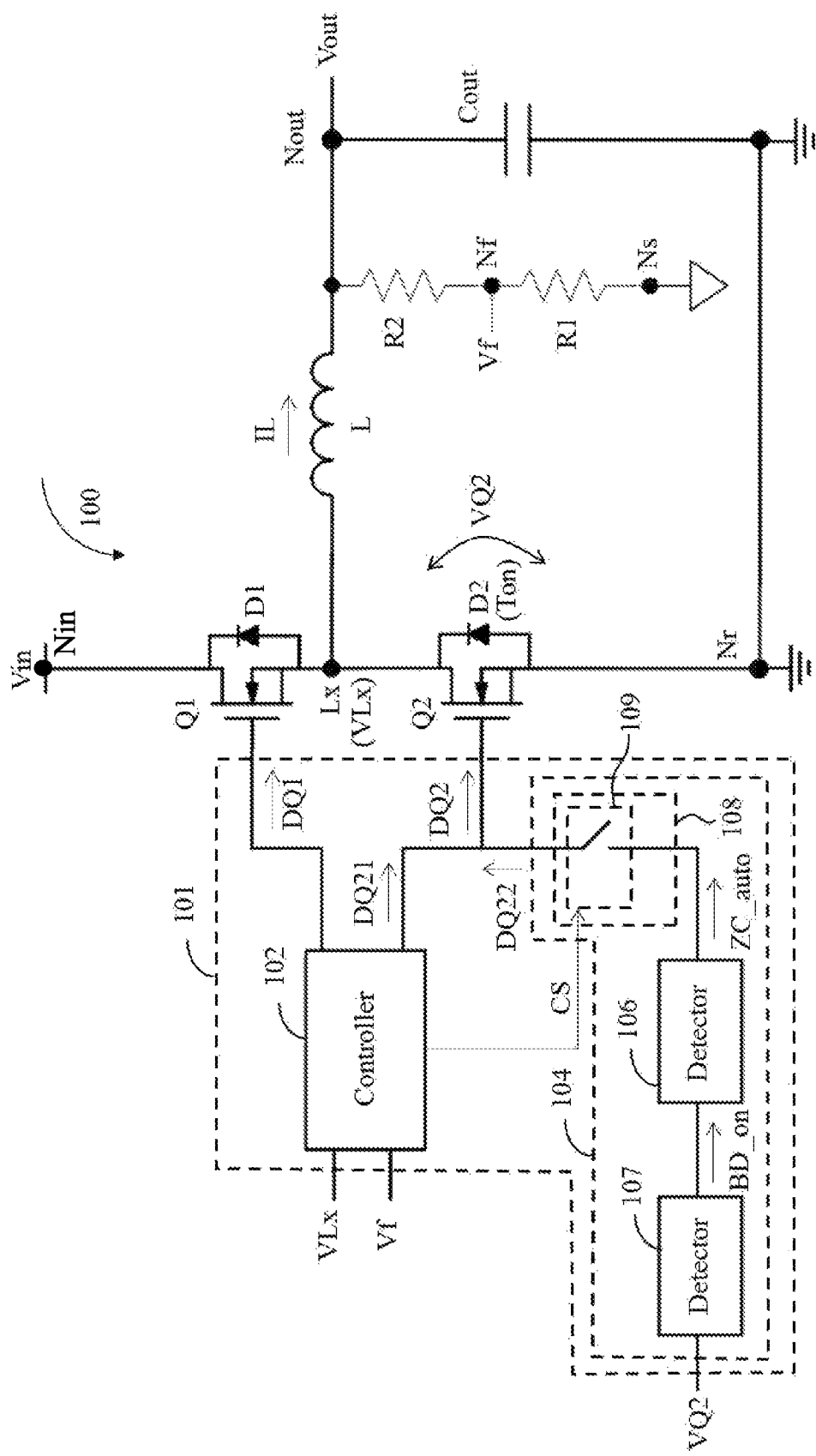
FIG. 1 illustrates a portion of an exemplary switching regulator in examples of the present disclosure.

FIG. 1 illustrates a portion of an exemplary switching regulator in examples of the present disclosure.

The switching regulator 100 can be configured to convert an input voltage Vin to an output voltage Vout. In the present disclosure, the switching regulator 100 can be implemented as a buck converter for illustrative purposes. Those skilled in the art will recognize that the switching regulator 100 can be implemented as other types of power converters, for example but is not limited to a boost converter, or a buck-boost converter, without departing from the scope of the present disclosure.

The switching regulator 100 may include switches Q1 and Q2, an inductor L, a capacitor Cout, resistors R1 and R2, and a control circuit 101.

The switch Q1, which may have a diode D1, such as a body diode, can be selectively coupled between a node Nin and a node Lx according to a drive signal DQ1. The switch Q2, which may have a diode D2, such as a body diode, can be selectively coupled between the node Lx and a node Nr according to a drive signal DQ2. In the present example, the switch Q1, which may be referred to as a high-side switch, can be switched according to a level difference between the drive signal DQ1 and a floating signal at the node Lx. The switch Q2, which may be referred to as a low-side switch, can be switched according to a level difference between the drive signal DQ2 and a reference signal at the node Nr. For example, the node Nr may be connected to ground such that the reference signal may be a ground signal. In addition, the node Lx shared by the switches Q1 and Q2 may be referred to as a phase node or a switch node.

In examples of the present disclosure, the switching regulator 100 can be implemented as a synchronous switching regulator. The switch Q1 may be referred to as a main switch of the switching regulator 100. The switch Q2 may be referred to as a synchronous switch of the switching regulator 100. The switch Q1 can be implemented by an active switch, such as a field-effect transistor (FET), an MOSFET, an insulated gate bipolar transistor (IGBT) or other types of active switching devices. The switch Q2 can be implemented by an active switch, such as a field-effect transistor (FET), an MOSFET, an insulated gate bipolar transistor (IGBT) or other types of active switching devices. The diode D1 can be a body diode of the switch Q1. The diode D2 can be a body diode of the switch Q2.

The inductor L can be coupled between the node Lx and a node Nout. The capacitor Cout can be coupled between the node Nout and the node Nr. The inductor L and the capacitor Cout may function as a filter to filter a voltage VLx at the node Lx to produce the output voltage Vout.

The resistors R1 and R2, which can be coupled in series between the node Nout and a node Ns, may function as a feedback circuit configured to generate a voltage Vf at a node Nf according to the output voltage Vout. The node Ns may be coupled to a reference voltage, such as a supply voltage or a ground voltage.

The control circuit 101, which can be coupled to the switches Q1 and Q2, may be configured to generate the drive signals DQ1 and DQ2 according to the voltages VLx and Vf, thereby controlling switching operation of the switching regulator 100. In examples of the present disclosure, the drive signal DQ1 and the drive signal DQ2 may be two non-overlapping signals. In examples of the present disclosure, the drive signal DQ2 may be inverted with respect to the drive signal DQ1. It is worth noting that, in different operating modes, the control circuit 101 may employ different control schemes for switching operation. By way of example but not limitation, the control circuit 101 may use a drive signal DQ21 as the drive signal DQ2 in a mode such as a continuous conduction mode (CCM). The drive signal DQ21 is generated according to one control scheme such as a pulse width modulation (PWM) scheme. In another mode such as a discontinuous conduction mode (DCM), the control circuit 101 may use a drive signal DQ22 as the drive signal DQ2. The drive signal DQ22 is generated according to another control scheme such as a pulse frequency modulation (PFM) scheme.

In examples of the present disclosure, the control circuit 101 may include a controller 102 and a detection circuit 104. The controller 102 can be configured to generate the drive signals DQ1 and DQ21 according to the voltages VLx and Vf. The detection circuit 104 can be configured to generate the drive signal DQ22 by detecting an inductor current IL flowing through the inductor L. The detection circuit 104 may include, for example but is not limited to, a detector 106, a detector 107 and a drive circuit 108. The detector 106 may be configured to generate a detection signal ZC_auto according to a conduction state of the diode D2. The detection signal ZC_auto can indicate whether the inductor current IL flowing through the inductor L reaches a current threshold. In examples of the present disclosure, the current threshold can be a positive current level. In examples of the present disclosure, the current threshold may be a zero-current level which is relatively close or substantially equal to zero, such that the detector 106 can be used for zero current detection (ZCD).

The detector 107, which can be coupled between the switch Q2 and the detector 106, may be configured to detect a voltage drop VQ2 across the diode D2 to output a detection signal BD_on. In the present example, the node Nr can be coupled to a ground signal. As a result, the detector 107, coupled to the switch Q2 through the node Lx, can detect the voltage drop VQ2 by sensing the voltage VLx at the node Lx. The detection signal BD_on can indicate the conduction state of the diode D2. For example, the detection signal BD_on can indicate a time Ton of the diode D2, such as a conduction time or a non-conduction time of the diode D2.

The drive circuit 108 can be coupled to the controller 102, the switch Q2 and the detector 106. The drive circuit 108 may be configured to generate the drive signal DQ22 according to the detection signal ZC_auto. When or after the detection signal ZC_auto indicates that the inductor current IL reaches the current threshold, the drive circuit 108 may turn off the switch Q2 according to the drive signal DQ22. In the present example, the drive circuit 108 may be controlled by a control signal CS generated from the controller 102. By way of example but not limitation, the drive circuit 108 may include a switching circuit 109 configured to selectively output the drive signal DQ22. When or after the switching circuit 109 is switched off to uncouple, or electrically disconnect, the detector 106 from the switch Q2, the drive circuit 108 may not output the drive signal DQ22. When or after the switching circuit 109 is switched on, the drive circuit 108 may output the drive signal DQ22 to control the switch Q2. It is worth noting that the switching circuit 109 can be implemented by various types of circuits capable of selectively outputting the drive signal DQ2. For example, the switching circuit 109 can be implemented by, but is not limited to, a switch device, a gating device or an AND gate.

In operation, when the switching regulator 100 operates in a first mode, the controller 102 may generate the drive signal DQ21 to control the switch Q2, and generate the control signal CS to switch off the switching circuit 109. When the switching regulator 100 operates in a second mode, the detector 106 may generate the detection signal ZC_auto according to the conduction state of the diode D2. The detection signal ZC_auto may change from one signal level to another different signal level, e.g. toggling from a low level to a high level or from a logic low level to a logic high level, at a time at which the inductor current IL reaches or falls below the current threshold. The controller 102 may generate the control signal CS to switch on the switching circuit 109, such that the drive circuit 108 may output the drive signal DQ22 according to the detection signal ZC_auto. When the detection signal ZC_auto indicates that the inductor current IL reaches or falls below the current threshold, the drive circuit 108 may turn off the switch Q2 according to the drive signal DQ22.

It is worth noting that the detection circuit 104 can utilize an auto-tuning detection scheme to generate the detection signal ZC_auto. Before the inductor current IL reaches the current threshold, the detector 106 can refer to the conduction state of the diode D2 to dynamically adjust a time at which the detection signal ZC_auto changes from one signal level to another signal level. When the conduction state of the diode D2 indicates that the inductor current IL reaches or falls below the current threshold, the detection signal ZC_auto can change from one signal level to another different signal level. As a result, the detection signal ZC_auto outputted from the detector 106 can change from one signal level to another different signal level at the time at which the inductor current IL reaches or falls below the current threshold. The drive circuit 108 can turn off the switch Q2 at a suitable or optimal time according to the drive signal DQ22.

By way of example but not limitation, when a conduction time of the diode D2 is greater than a time threshold, the detection circuit 104 can delay the time at which the detection signal ZC_auto changes from one signal level to another different signal level, thereby extending a turn-on time of the switch Q2. As another example, when a conduction time of the diode D2 is less than a time threshold, the detection circuit 104 can advance the time at which the detection signal ZC_auto changes from one signal level to another different signal level, thereby shortening a turn-on time of the switch Q2. An inductor current flowing through a diode of a switch, e.g. the diode D1 or the diode D2, may decrease because the detection circuit 104 can turn off the switch Q2 at a relatively good, suitable, appropriate or optimal time, which can reduce or minimize conduction loss such as conduction loss in the diode of the switch.

Figure 2:
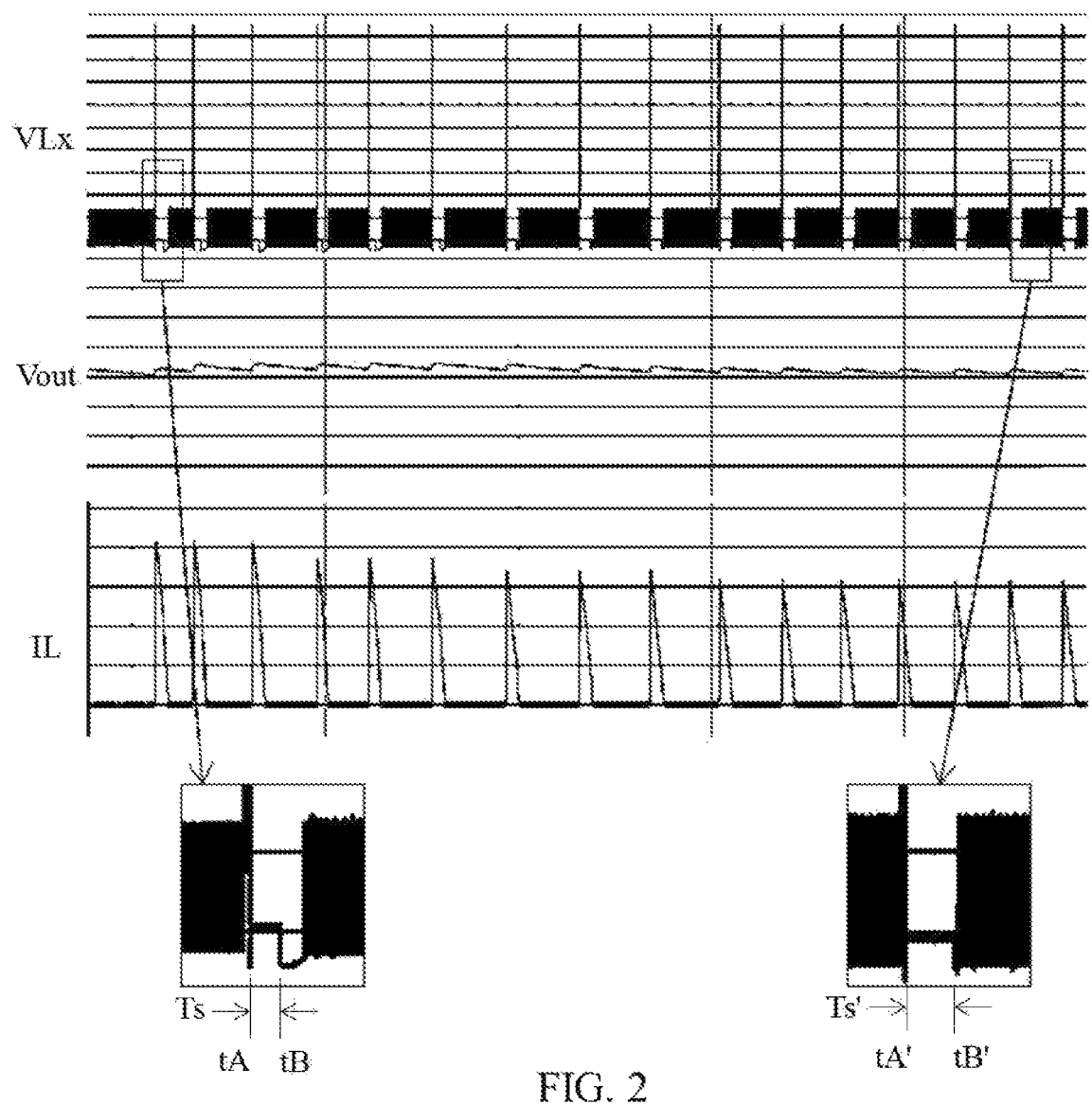
FIG. 2 illustrates signal waveforms generated in the switching regulator shown in FIG. 1 in examples of the present disclosure.

FIG. 2 illustrates signal waveforms generated in the switching regulator 100 shown in FIG. 1 in examples of the present disclosure. Referring to FIG. 2 and also to FIG. 1, the switch Q1 is turned off at a time tA in a switching cycle, and the switch Q2 is turned off at a time tB after a period of time Ts has elapsed. When the switch Q2 is turned off, the voltage VLx may drop below zero since the inductor current IL flows through the diode D2 to develop a voltage thereacross. To reduce a conduction time of the diode D2, the switching regulator 100 can utilize the auto-tuning detection scheme to delay a time at which the switch Q2 is turned off, which can reduce conduction loss in the diode D2. For example, in a second switching cycle after the first switching cycle, the switch Q2 is turned off at a time tB' after a period of time Ts' has elapsed from a time tA' at which the switch Q1 is turned off. As the period of time Ts' is greater than the period of time Ts, a current level of the inductor current IL may be substantially equal to or relatively close to zero when the switch Q2 is turned off, which can reduce a conduction time of the diode D2 and conduction loss therein.

In examples of the present disclosure, the auto-tuning detection scheme can gradually delay a time at which the switch Q2 is turned off before the current level of the inductor current IL reaches a current threshold, which is substantially equal to or relatively close to zero ampere (A). The auto-tuning detection scheme may take one or more switching cycles to reduce the zero current level of the inductor current IL to the current threshold. For example, in a third switching cycle between the first switching cycle and the second switching cycle, an elapsed time between a time the switch Q1 is turned off and a time the switch Q2 is turned off is greater than the period of time Ts while less than the period of time Ts'. Additionally, in the third switching cycle, when the switch Q2 is turned off, the inductor current IL may reach a current level which is greater than the current threshold since the conduction time of the diode D2 has not reduced to a time threshold or a target time.

Variations of FIG. 1 may be introduced. In examples of the present disclosure, at least one of the detector 106, the detector 107 and the drive circuit 108 can be integrated into the controller 102. In examples of the present disclosure, where the controller 102 can selectively enable the detector 106 to perform current detection, the drive circuit 108 may be optional. In examples of the present disclosure, the switching regulator 100 can be implemented using other buck converter topologies. For example, the switching regulator 100 can be implemented as a forward converter which is a buck derived converter with a transformer. As long as a detection circuit can refer to a conduction state of a diode of a switch to dynamically or adaptively adjust a time at which the switch is turned off, associated modifications and alternatives fall within the contemplated scope of the present disclosure.

To facilitate understanding of the present disclosure, examples of the present disclosure associated with ZCD are given in the following for further description of the auto-tuning detection scheme.

Figure 3:
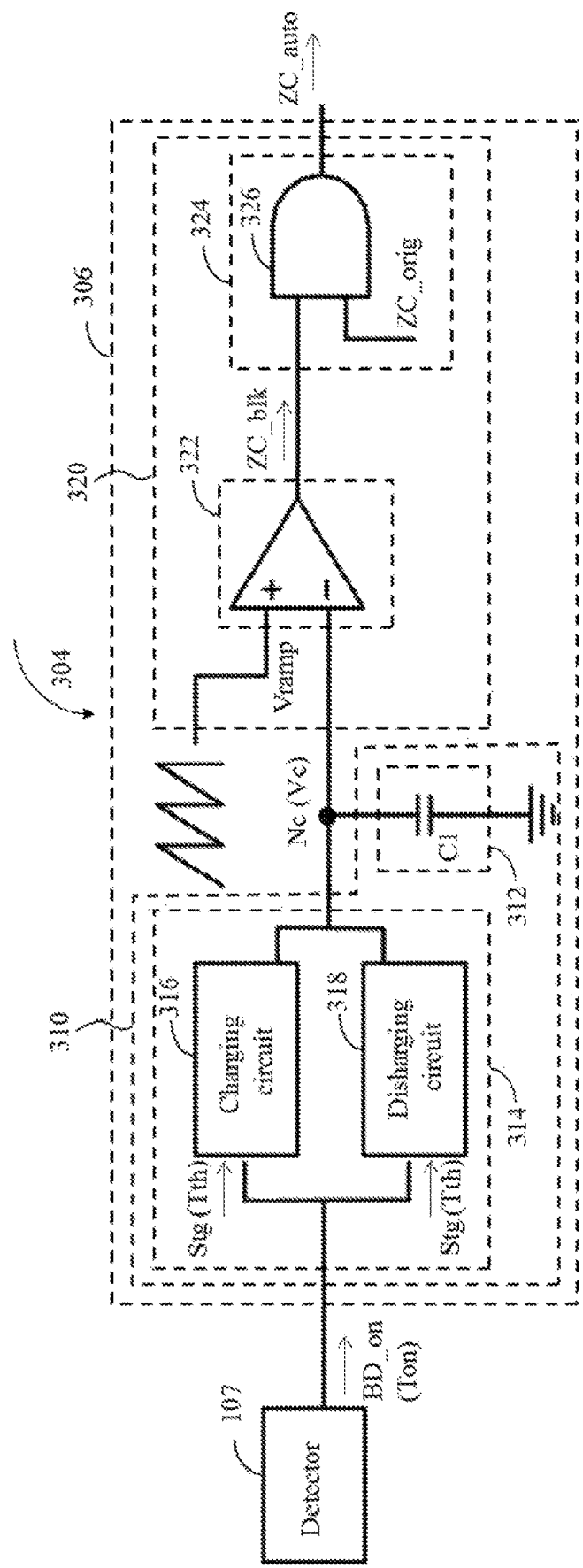
FIG. 3 illustrates an implementation of the detection circuit shown in FIG. 1 in examples of the present disclosure.

FIG. 3 illustrates an implementation of the detection circuit 104 shown in FIG. 1 in examples of the present disclosure. Referring to FIG. 3 and also to FIG. 1, the detection circuit 304 includes the detector 107 and a detector 306, which can represent an example of the detector 106. The detector 306 includes, for example but is not limited to, a comparison circuit 310 and a signal generating circuit 320. The comparison circuit 310, which may have a node Nc, can be configured to compare the time Ton with a time threshold Tth to provide a voltage Vc at the node Nc. The time threshold Tth may be a target time for a conduction time of the diode D2. In the present example, the comparison circuit 310 can be configured to compare the time Ton with the time threshold Tth by performing signal processing upon the detection signal BD_on and a predetermined signal Stg, which can indicate the time threshold Tth.

The comparison circuit 310 can be configured to compare the time Ton with the time threshold Tth to selectively adjust a charge accumulated at the node Nc, thereby producing the voltage Vc at the node Nc. For example, the comparison circuit 310 may include a charge storage device 312 and a processing circuit 314. The charge storage device 312 can be coupled to the node Nc. The charge storage device 312 can be implemented to include a capacitor C1 in the present example. The processing circuit 314, which may be coupled to the charge storage device 312 through the node Nc, can be configured to compare the time Ton with the time threshold Tth to adjust the charge stored in the charge storage device 312, and accordingly adjust the voltage Vc at the node Nc. For example, when the time Ton of the diode D2 is greater than the time threshold Tth, the processing circuit 314 can be configured to charge the node Nc to increase the charge stored in the charge storage device 312. As another example, when the time Ton of the diode D2 is less than the time threshold Tth, the processing circuit 314 can be configured to discharge the node Nc to decrease the charge stored in the charge storage device 312.

In the present example, the processing circuit 314 may include a charging circuit 316 and a discharging circuit 318. The charging circuit 316 can be coupled to the node Nc. When the time Ton of the diode D2 is greater than the time threshold Tth, the charging circuit 316 can be configured to charge the charge storage device 312 to increase the voltage Vc at the node Nc. The discharging circuit 318 can be coupled to the node Nc. When the time Ton of the diode D2 is less than the time threshold Tth, the discharging circuit 318 can be configured to discharge the charge storage device 312 to decrease the voltage Vc at the node Nc.

The signal generating circuit 320, which may be coupled to the comparison circuit 310 through the node Nc, can be configured to output the detection signal ZC_auto according to the voltage Vc. It is worth noting that the time Ton of the diode D2 may affect an amount of current flowing through the diode D2. As the voltage Vc is provided in response to a comparison result of the time Ton and the time threshold Tth, the detection signal ZC_auto generated using the voltage Vc can indicate whether a current flowing through the diode D2, e.g. the inductor current IL, reaches a current threshold.

The signal generating circuit 320 may include a comparator 322 and an output circuit 324. The comparator 322, which may be coupled to the node Nc, can be configured to compare a ramp voltage Vramp with the voltage Vc to generate a control signal ZC_blk. When or after the ramp voltage Vramp reaches the voltage Vc, the control signal ZC_blk may change from a signal level to another signal level. In the present example, the comparator 322 can be implemented by an amplifier such as an error amplifier.

The output circuit 324, which may be coupled to the comparator 322, can be configured to output the detection signal ZC_auto according to the control signal ZC_blk. Before the control signal ZC_blk indicates that the ramp voltage Vramp reaches the voltage Vc, e.g. the ramp voltage Vramp is lower than the voltage Vc, the output circuit 324 can be configured to output the detection signal ZC_auto have a signal level. When the control signal ZC_blk indicates that the ramp voltage Vramp reaches the voltage Vc, the output circuit 324 can be configured to output the detection signal ZC_auto having another signal level different from the signal level. As a result, the detection signal ZC_auto can change from one signal level to another signal level, e.g. toggling from a low level to a high level or from a logic low level to a logic high level, at a time at which the ramp voltage Vramp reaches the voltage Vc.

As the comparison circuit 310 can adjust the voltage Vc according to the time Ton of the diode D2, and the signal generating circuit 320 can adjust the detection signal ZC_auto according to the voltage Vc, the time Ton of the diode D2 can be adjusted according to the drive signal DQ22 shown in FIG. 1, which can be generated in response to the detection signal ZC_auto.

Figure 4:
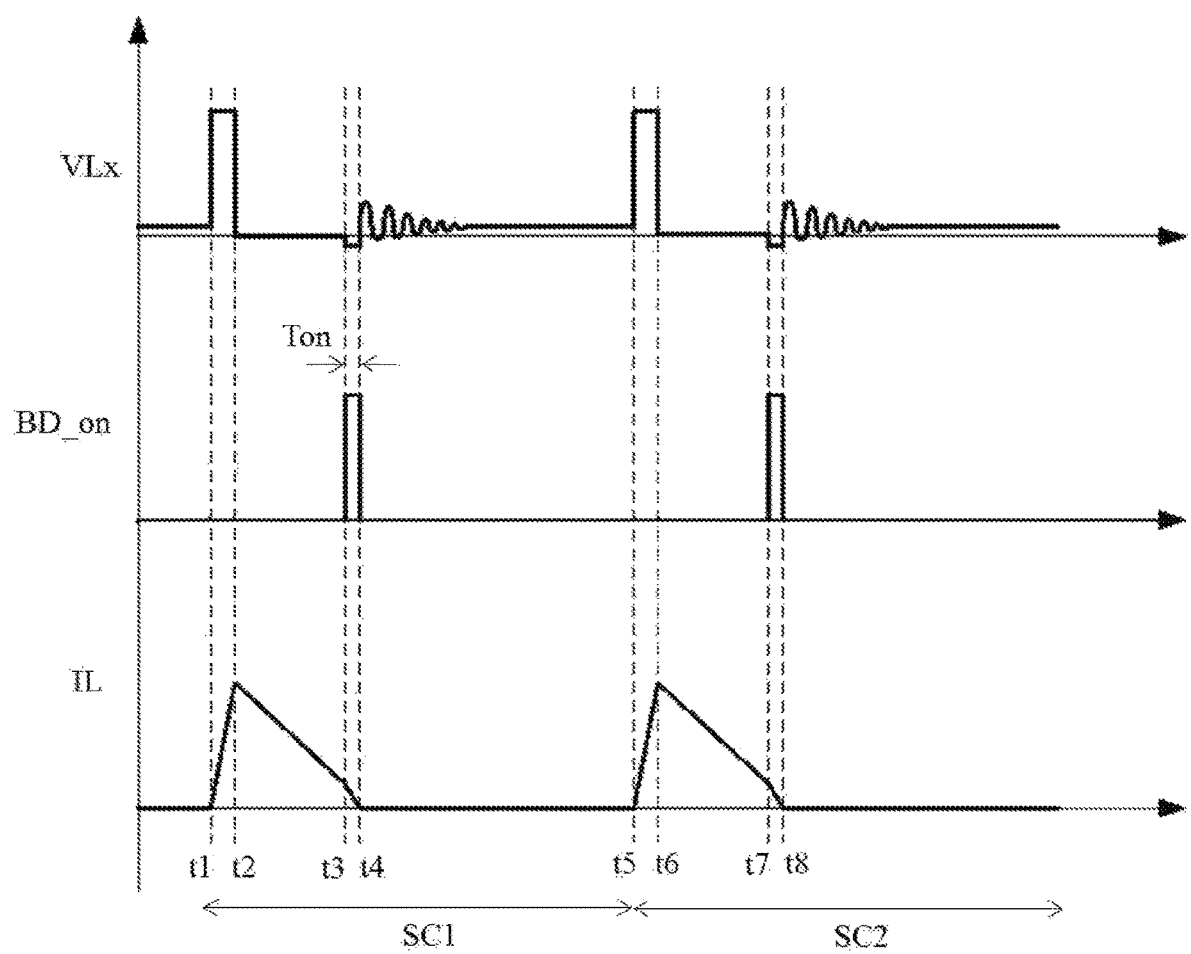
FIG. 4 illustrates signal waveforms of the voltage, the detection signal and the inductor current shown in FIG. 1 in examples of the present disclosure.

FIG. 4 illustrates signal waveforms of the voltage VLx, the detection signal BD_on and the inductor current IL shown in FIG. 1 in examples of the present disclosure. In the present example, the detector 106 shown in FIG. 1 can be implemented by the detector 306 shown in FIG. 3. The switching regulator 100 shown in FIG. 1 may operate in a mode, where the drive signal DQ22 serves as the drive signal DQ2 to control the switch Q2, to produce the signal waveforms shown in FIG. 4.

Referring to FIG. 1, FIG. 3 and FIG. 4, before a time t1, each of the switch Q1 and the switch Q2 is in an off state. At the time t1, the switching regulator 100 may enter a switching cycle SC1. The switch Q1 is turned on such that each of the voltage VLx and the inductor current IL may increase. At a time t2, the switch Q1 is turned off, and the switch Q2 is turned on. The voltage VLx may drop to the reference voltage at the node Nr. The inductor current IL may decrease gradually. At a time t3, the switch Q2 is turned off. The inductor current IL may flow through the diode D2, which can result in a negative voltage developed at the node Lx. At a time t4, the diode D2 is reversed biased and turned off. The comparison circuit 310 may compare the time Ton with the time threshold Tth to selectively adjust the voltage Vc at the node Nc. A duration of a high level portion of the detection signal BD_on can represent the time Ton. At a time t5, the switching regulator 100 may enter a switching cycle SC2.

In examples of the present disclosure, when the time Ton is equal to the time threshold Tth, the comparison circuit 310 may not adjust the voltage Vc at the node Nc. The detection signal ZC_auto may change from one signal level to another different signal level, e.g. toggling from one of a low level and a high level to the other, at a time at which the inductor current IL reaches the current threshold. Also, the switch Q2 can be turned off according to the drive signal DQ22 at the time at which the inductor current IL reaches the current threshold. As a result, a turn-on time of the switch Q2 in the switching cycle SC2 can be equal to that in the switching cycle SC1.

In examples of the present disclosure, when the time Ton is different from the time threshold Tth, the comparison circuit 310 may adjust the voltage Vc at the node Nc according to a comparison result of the time Ton and the time threshold Tth. The signal generating circuit 320 can be configured to adjust the detection signal ZC_auto accordingly since the inductor current IL has not reached the current threshold. When the signal generating circuit 320 is configured to delay toggling of the detection signal ZC_auto, the drive circuit 108 can extend the turn-on time of the switch Q2 according to the detection signal ZC_auto. When the signal generating circuit 320 is configured to toggle the detection signal ZC_auto in advance, the drive circuit 108 can shorten the turn-on time of the switch Q2 according to the detection signal ZC_auto.

For example, when the time Ton is greater than the time threshold Tth, the signal generating circuit 320 can be configured to delay a time at which the detection signal ZC_auto changes from one signal level to another signal level according to the voltage Vc. The switch Q2 can be turned off according to the drive signal DQ22 at the time at which the detection signal ZC_auto changes from one signal level to another signal level. As a result, a turn-on time of the switch Q2 can be extended according to the detection signal ZC_auto. An elapsed time between a time t6 and a time t7 may increase as compared to that between the time t2 and the time t3. In addition, a conduction time of the diode D2 may be shortened. An elapsed time between the time t7 and a time t8 may decrease as compared to that between the time t3 and the time t4.

As another example, when the time Ton is less than the time threshold Tth, the signal generating circuit 320 can be configured to advance a time at which the detection signal ZC_auto changes from one signal level to another signal level according to the voltage Vc. The switch Q2 can be turned off according to the drive signal DQ22 at the time at which the detection signal ZC_auto changes from one signal level to another signal level. As a result, a turn-on time of the switch Q2 can be shortened according to the detection signal ZC_auto. The elapsed time between the time t6 and the time t7 may decrease as compared to that between the time t2 and the time t3. In addition, the conduction time of the diode D2 may be extended. The elapsed time between the time t7 and the time t8 may increase as compared to that between the time t3 and the time t4.

Figure 5:
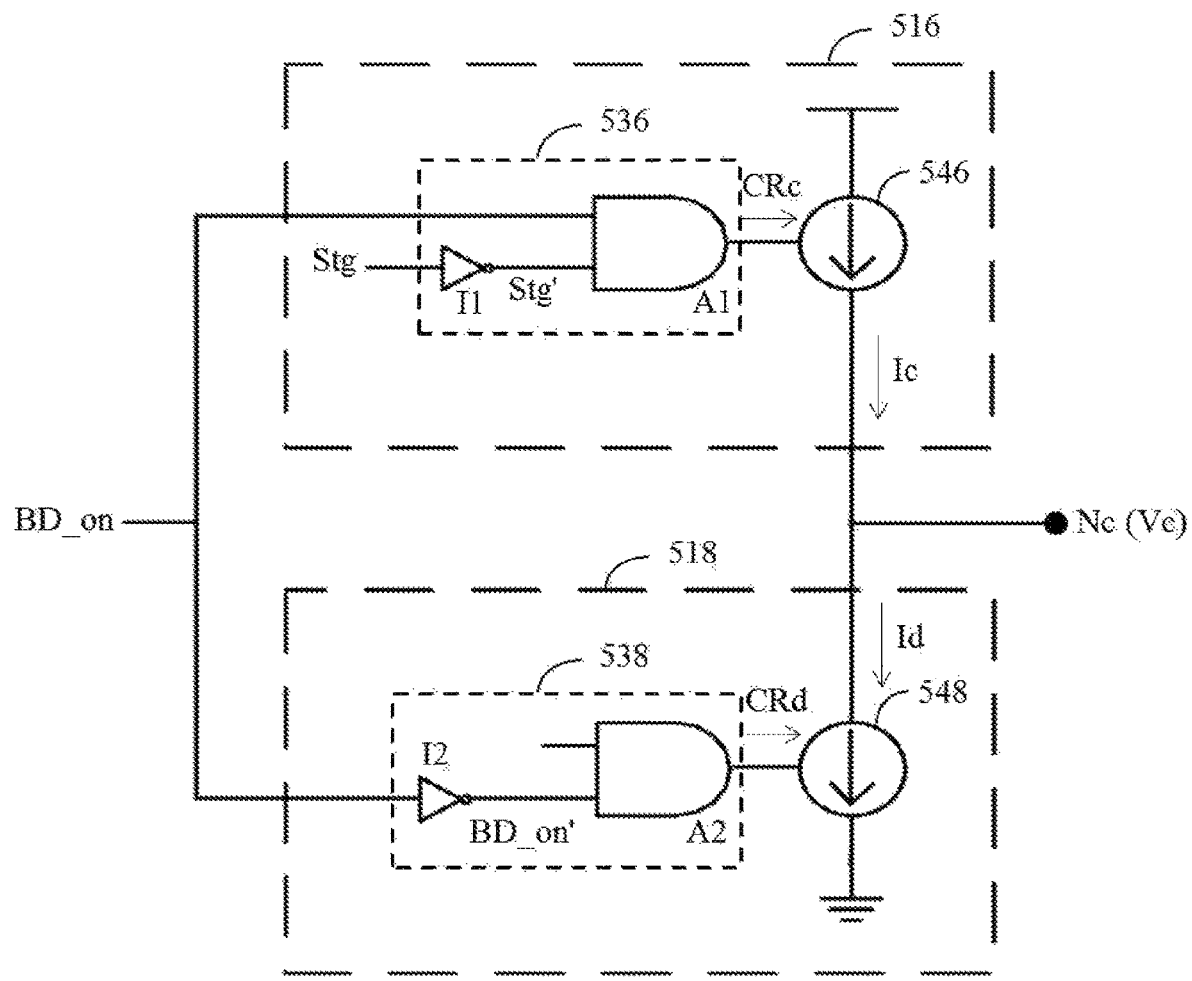
FIG. 5 illustrates implementations of the charging circuit and the discharging circuit shown in FIG. 3 in examples of the present disclosure.
Figure 6:
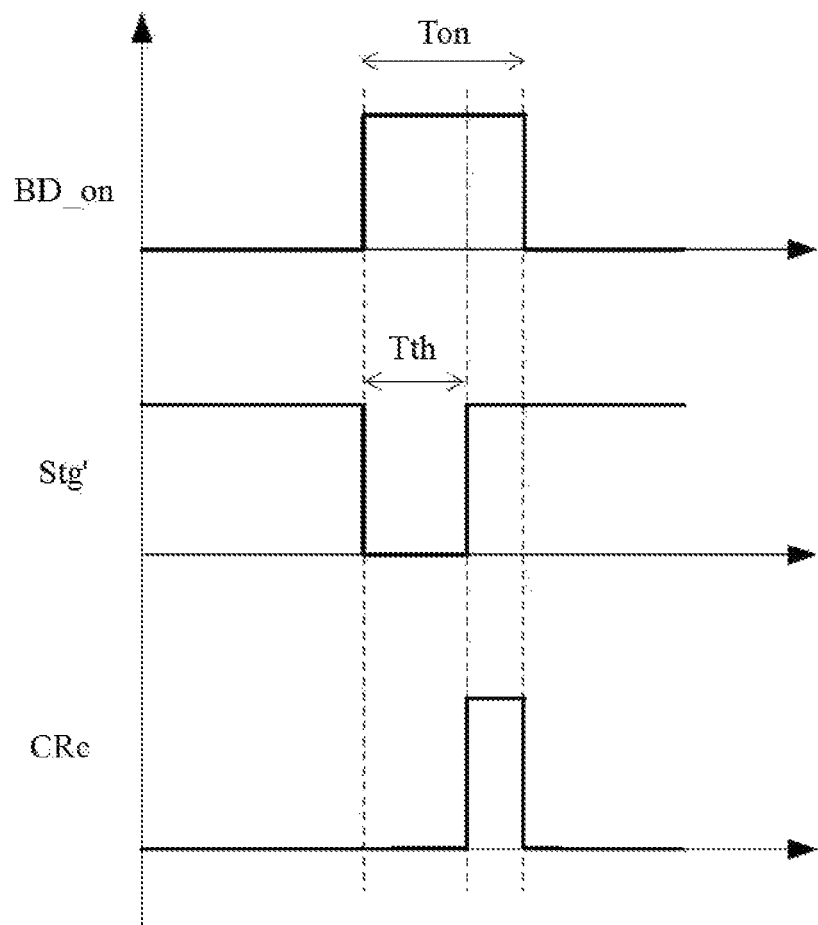
FIG. 6 illustrates signal waveforms associated with operation of the comparator shown in FIG. 5 in examples of the present disclosure.

FIG. 5 illustrates an implementation of the charging circuit 316 shown in FIG. 3 in examples of the present disclosure. The charging circuit 516 can represent an example of the charging circuit 316 shown in FIG. 3. The charging circuit 516 includes, for example but is not limited to, a comparator 536 and a current source 546. The comparator 536 can be configured to compare the time Ton of the diode D2 with the time threshold Tth to generate a comparison result CRc. The current source 546 may be coupled to the comparator 536. When the comparison result CRc indicates that the time Ton of the diode D2 is greater than the time threshold Tth, the current source 546 can be configured to provide a current Ic to the charge storage device 312 shown in FIG. 3. The voltage Vc In the present example, the comparator 536 can be implemented to include an inverter I1 and an AND gate A1. The inverter I1 can be configured to invert the predetermined signal Stg to generate an inverted signal Stg'. The AND gate A1 can be configured to receive the detection signal BD_on and the inverted signal Stg' to generate the comparison result CRc. FIG. 6 illustrates signal waveforms associated with operation of the comparator 536 shown in FIG. 5 in examples of the present disclosure. Referring to FIG. 6 and also to FIG. 5, a duration of a high level portion of the detection signal BD_on may represent the time Ton of the diode D2, and a duration of a high level portion of the predetermined signal Stg may represent the time threshold Tth. When an elapsed turn-on time of the diode D2 exceeds the time threshold Tth, the detection signal BD_on may have a high level and the predetermined signal Stg may have a low level. The AND gate A1 can output the comparison result CRc at the high level to indicate that the time Ton of the diode D2 is greater than the time threshold Tth. A duration of a high level portion of the comparison result CRc may represent a period of time during which the time Ton of the diode D2 is greater than the time threshold Tth.

When the comparison result CRc has the high level, the current source 546 can be activated to provide the current Ic to charge the node Nc, thereby increasing the voltage Vc. When the voltage Vc increases, it may take more time for the ramp voltage Vramp to reach the voltage Vc. The signal generating circuit 320 can delay a time at which the detection signal ZC_auto changes from one signal level to another signal level. As the switch Q2 shown in FIG. 1 can be turned off at the time at which the detection signal ZC_auto changes from one signal level to another signal level, a turn-on time of the switch Q2 shown in FIG. 1 can be extended.

FIG. 5 further illustrates an implementation of the discharging circuit 318 shown in FIG. 3 in examples of the present disclosure. The discharging circuit 518 can represent an example of the discharging circuit 318 shown in FIG. 3. The discharging circuit 518 includes, for example but is not limited to, a comparator 538 and a current sink 548. The comparator 538 can be configured to compare the time Ton of the diode D2 with the time threshold Tth to generate a comparison result CRd. The current sink 548 may be coupled to the comparator 538. When the comparison result CRd indicates that the time Ton of the diode D2 is less than the time threshold Tth, the current sink 548 can be configured to draw a current Id from the charge storage device 312 shown in FIG. 3

Figure 7:
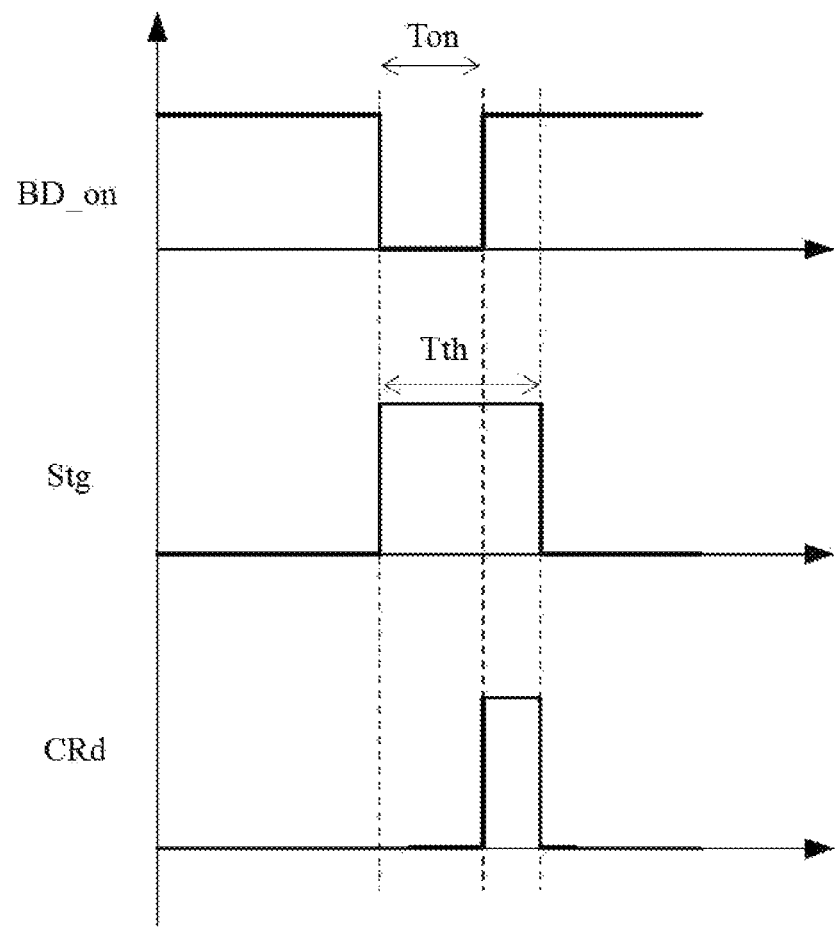
FIG. 7 illustrates signal waveforms associated with operation of the comparator shown in FIG. 5 in examples of the present disclosure.

In the present example, the comparator 538 can be implemented to include an inverter I2 and an AND gate A2. The inverter I2 can be configured to invert the detection signal BD_on to generate an inverted signal BD_on'. The AND gate A2 can be configured to receive the predetermined signal Stg and the inverted signal BD_on' to generate the comparison result CRd. FIG. 7 illustrates signal waveforms associated with operation of the comparator 538 shown in FIG. 5 in examples of the present disclosure. Referring to FIG. 7 and also to FIG. 5, a duration of a high level portion of the detection signal BD_on may represent the time Ton of the diode D2, and a duration of a high level portion of the predetermined signal Stg may represent the time threshold Tth. When the diode D2 is turned off before the time threshold Tth has elapsed, the detection signal BD_on may have a low level and the predetermined signal Stg may have a high level. The AND gate A2 can output the comparison result CRd at the high level to indicate that the time Ton of the diode D2 is less than the time threshold Tth. A duration of a high level portion of the comparison result CRd may represent a period of time during which the time Ton of the diode D2 is less than the time threshold Tth.

When the comparison result CRd has the high level, the current sink 548 can be activated to draw the current Id to discharge the node Nc, thereby decreasing the voltage Vc. When the voltage Vc decreases, it may take less time for the ramp voltage Vramp to reach the voltage Vc. The signal generating circuit 320 can advance a time at which the detection signal ZC_auto changes from one signal level to another signal level. As the switch Q2 shown in FIG. 1 can be turned off at the time at which the detection signal ZC_auto changes from one signal level to another signal level, a turn-on time of the switch Q2 shown in FIG. 1 can be shortened.

Referring back to FIG. 3, the output circuit 324 may receive a detection signal ZC_orig. The detection signal ZC_orig can change from one signal level to another signal level at a time earlier than a time at which the detection signal ZC_auto changes from one signal level to another signal level. By selectively using the detection signal ZC_orig as the detection signal ZC_auto according to the control signal ZC_blk, the output circuit 324 can control the time at which the detection signal ZC_auto changes from one signal level to another signal level, thereby controlling a switching timing of the switch Q2 shown in FIG. 1.

Figure 8:
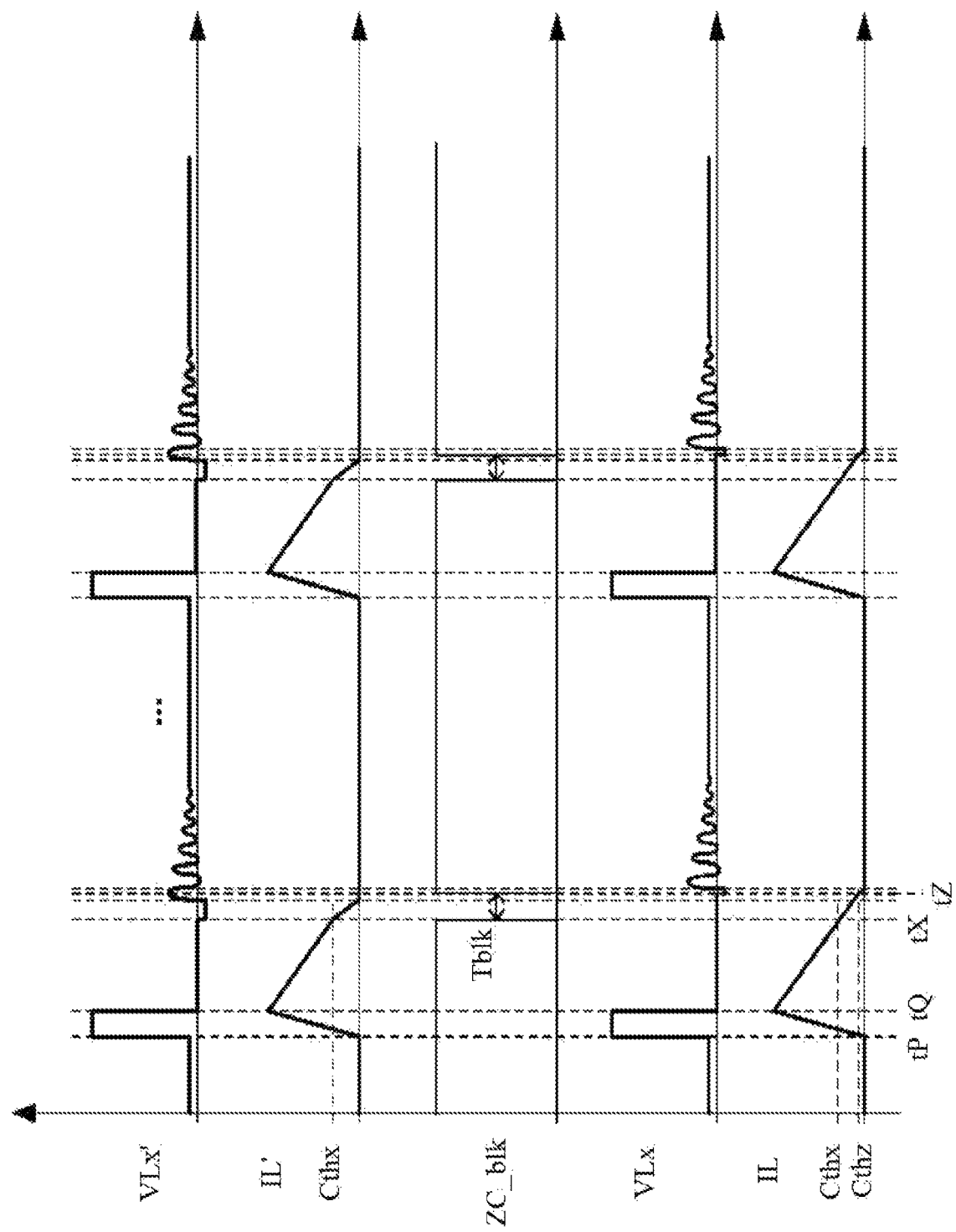
FIG. 8 illustrates signal waveforms associated with operation of the detector shown in FIG. 3 in examples of the present disclosure.
Figure 9:
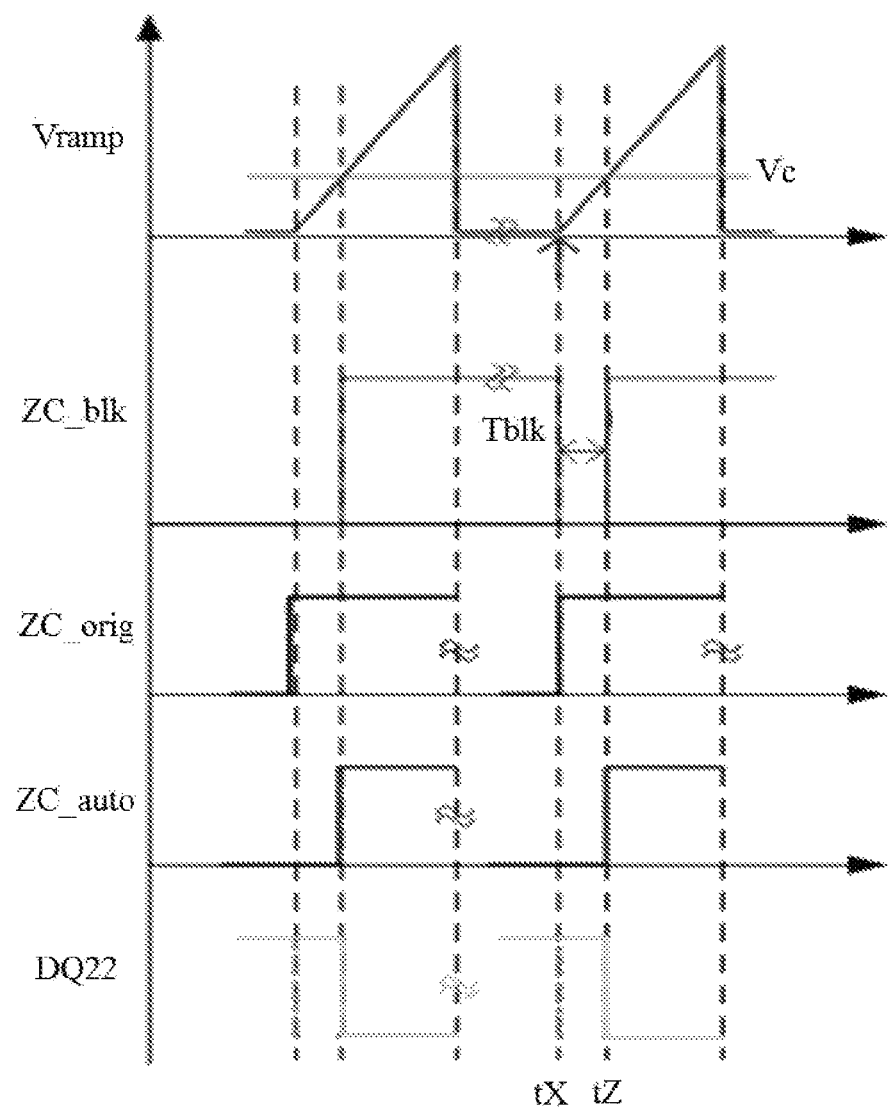
FIG. 9 illustrates signal waveforms associated with operation of the detector shown in FIG. 3 in examples of the present disclosure.

In the present example, the output circuit 324 can be implemented to include an AND gate 326. The AND gate 326 can be configured to receive the control signal ZC_blk and the detection signal ZC_orig to generate the detection signal ZC_auto. FIG. 8 and FIG. 9 illustrate signal waveforms associated with operation of the detector 306 shown in FIG. 3 in examples of the present disclosure. Referring to FIG. 3, FIG. 8 and FIG. 9, at a time tP, the switch Q1 is turned on, and the switch Q2 is maintained in an off state. Each of the voltage VLx and the inductor current IL increases. At a time tQ, the switch Q1 is turned off, while the switch Q2 is turned on. The voltage VLx may drop to the reference voltage at the node Nr. The inductor current IL may decrease gradually.

At a time tX, as the inductor current IL shown in FIG. 1 decreases to a current threshold Cthx, the detection signal ZC_orig can change from one signal level to another signal level e.g. toggling from a low level to a high level or from a logic low level to a logic high level. In the present example, the ramp voltage Vramp may start to rise at the time tX. As the ramp voltage Vramp has not reached the voltage Vc, the control signal ZC_blk can stay at a signal level, e.g. a low level or a logic low level in the present example. As a result, the detection signal ZC_auto may stay at a signal level such as a low level or a logic low level. The switch Q2 shown in FIG. 1 can be maintained in an on state.

At a time tZ, as the ramp voltage Vramp reaches the voltage Vc, the control signal ZC_blk can change from the signal level to another signal level, e.g. a high level or a logic high level in the present example. The output circuit 324 can be configured to use the detection signal ZC_orig as the detection signal ZC_auto according to the control signal ZC_blk. For example, as the control signal ZC_blk is at the high level, the AND gate 326 can output the detection signal ZC_auto having the high level. The toggling of the detection signal ZC_auto can indicate that the inductor current IL shown in FIG. 1 reaches a current threshold Cthz, such as a zero-current threshold for ZCD. As a result, the switch Q2 shown in FIG. 1 can be turned off according to the drive signal DQ22 shown in FIG. 1, which can be generated in response to the detection signal ZC_auto.

In examples of the present disclosure, the detection signal ZC_auto can be implemented by a detection signal which is delayed by a period of time Tblk as compared with the detection signal ZC_orig. The period of time Tblk can be adjusted in response to the voltage Vc.

FIG. 8 further illustrates signal waveforms of the voltage VLx' and the inductor current IL' for comparison purposes. The voltage VLx' represents a voltage at the node Lx shown in FIG. 1 in a situation where the switch Q2 is turned off at the time tX according to the detection signal ZC_orig. The inductor IL' represents a current flowing through the inductor L shown in FIG. 1 in this situation. Referring to FIG. 8 and also to FIG. 1, when the switch Q2 is turned off at the time tX according to the detection signal ZC_orig, the diode D2 can conduct for a period of time Tx. When the switch Q2 is turned off at the time tZ according to the detection signal ZC_auto, which can be regarded as a delayed version of the detection signal ZC_orig, the diode D2 can conduct for a period of time Tz much less than the period of time Tx. As a result, the diode D2 can have relatively low conduction loss when the switch Q2 is controlled according to the detection signal ZC_auto.

The circuit topologies described above are provided for illustrative purposes, and are not intended to limit the scope of the present disclosure. In examples of the present disclosure, the charging circuit 316 shown in FIG. 3 can be implemented using other circuit structures different from the charging circuit 516 shown in FIG. 5. In examples of the present disclosure, the discharging circuit 318 shown in FIG. 3 can be implemented using other circuit structures different from the discharging circuit 518 shown in FIG. 5. In examples of the present disclosure, the ramp voltage Vramp shown in FIG. 3 may be implemented to have a ramp waveform different from the ramp waveform shown in FIG. 9. In examples of the present disclosure, the ramp voltage Vramp shown in FIG. 3 may be implemented using other types of oscillating voltages.

With the use of a time threshold for a diode conduction time, the auto-tuning detection scheme can adaptively and automatically adjust a turn-on time of a switch, thereby adjusting the diode conduction time to approach or equal the time threshold in a few switching cycles. The switch can be turned off at a time at which an inductor current reaches to a zero-current level that is relatively close to or substantially equal to zero. The auto-tuning detection scheme can reduce conduction loss in a diode of the switch. In addition, the auto-tuning detection scheme can be implemented as an analog control scheme. As a result, a detection circuit implemented using the auto-tuning detection scheme may not encounter digital resolution limitations and space constraints on digital control. Such detection circuit can use a small die area or silicon area as compared with a digital detection circuit.

Figure 10:
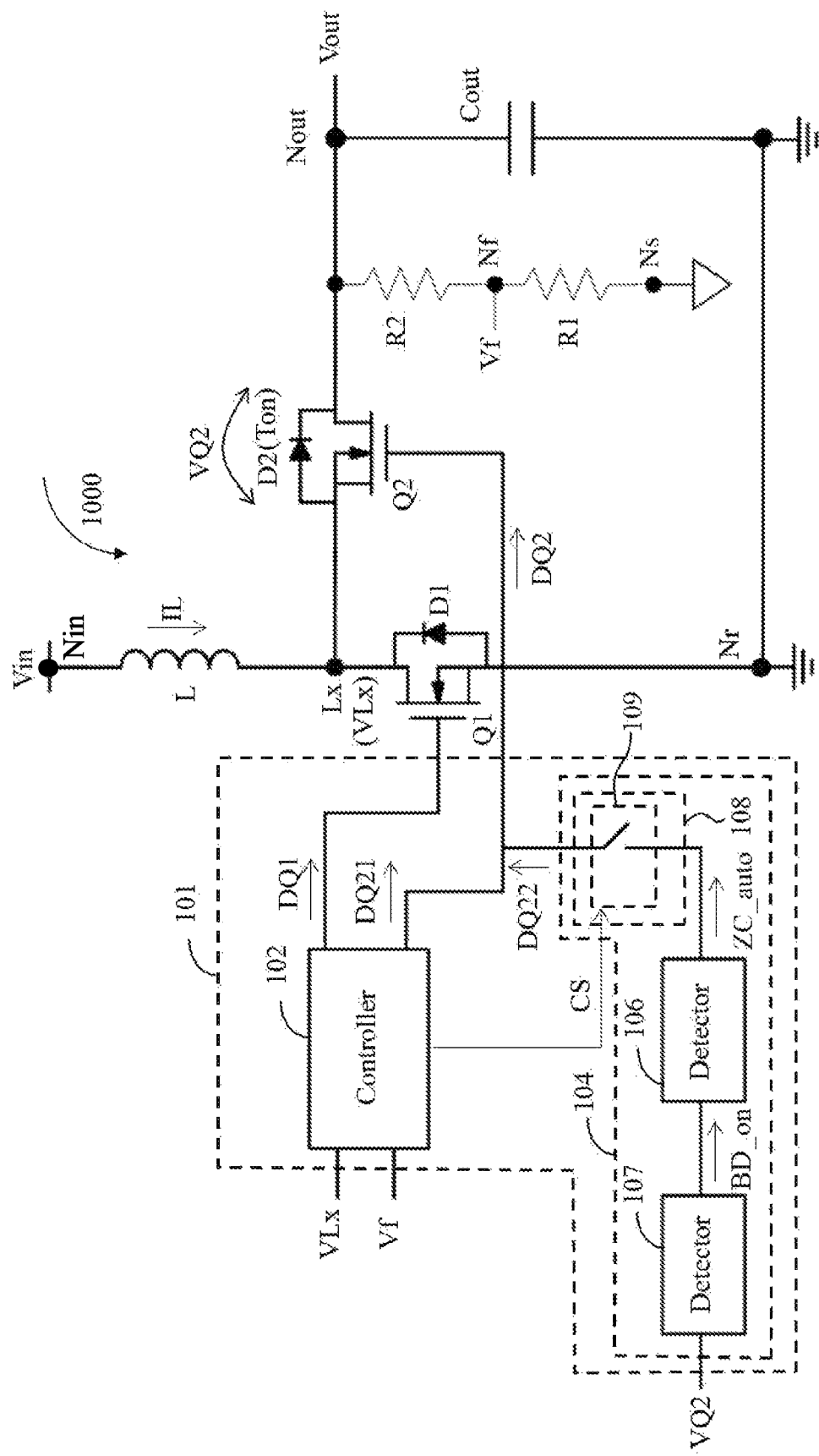
FIG. 10 illustrates a portion of an exemplary switching regulator in examples of the present disclosure.

The auto-tuning detection scheme can be employed in various circuit topologies. FIG. 10 illustrates a portion of an exemplary switching regulator in examples of the present disclosure. The circuit structure of the switching regulator

1000 shown in FIG. 10 is similar to that of the switching regulator 100 shown in FIG. 1 except that the inductor L, the switch Q1 and the switch Q2 shown in FIG. 10 are coupled in a different manner to implement a boost converter. In the present example, the inductor L can be coupled between the node Nin and the node Lx. The switch Q1 can be selectively coupled between the node Lx and the node Nr according to the drive signal DQ1. The switch Q2 can be selectively coupled between the node Lx and the node Nout according to the drive signal DQ2.

Figure 11:
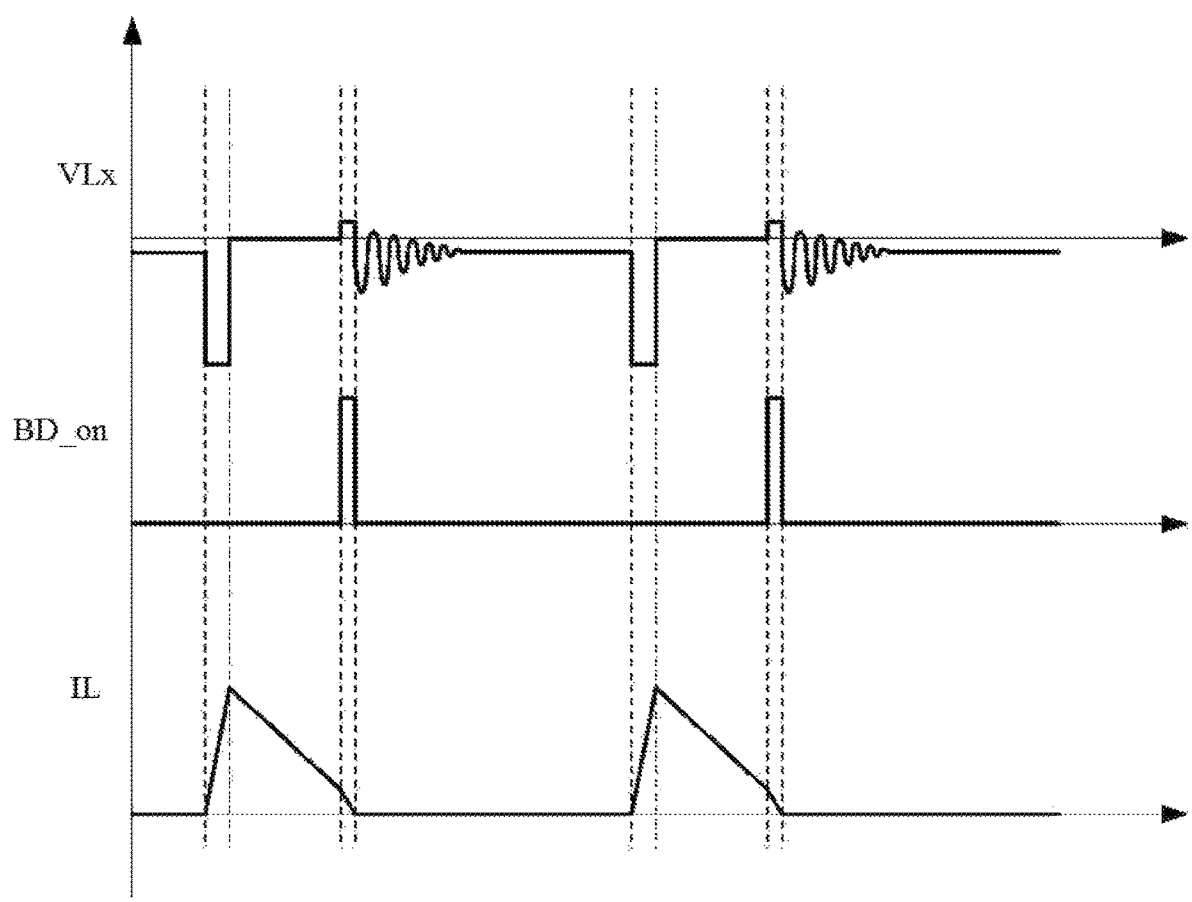
FIG. 11 illustrates signal waveforms of the voltage, the detection signal and the inductor current shown in FIG. 10 in examples of the present disclosure.

FIG. 11 illustrates signal waveforms of the voltage VLx, the detection signal BD_on and the inductor current IL shown in FIG. 10 in examples of the present disclosure. In the present example, the detector 106 shown in FIG. 10 can be implemented by the detector 306 shown in FIG. 3. The switching regulator 1000 shown in FIG. 10 may operate in a mode, where the drive signal DQ22 serves as the drive signal DQ2 to control the switch Q2, to produce the signal waveforms shown in FIG. 11. By adjusting a diode conduction time to approach or equal a time threshold, the detection circuit 104 can turn off the switch Q2 at a suitable or optimal time, which can reduce conduction loss in the diode D2. As those skilled in the art can readily understand operation of the switching regulator 1000 shown in FIG. 10 and generation of the signal waveforms shown in FIG. 11 after reading the above paragraphs directed to FIG. 1 to FIG. 9, further description is omitted here for brevity.

Figure 12:
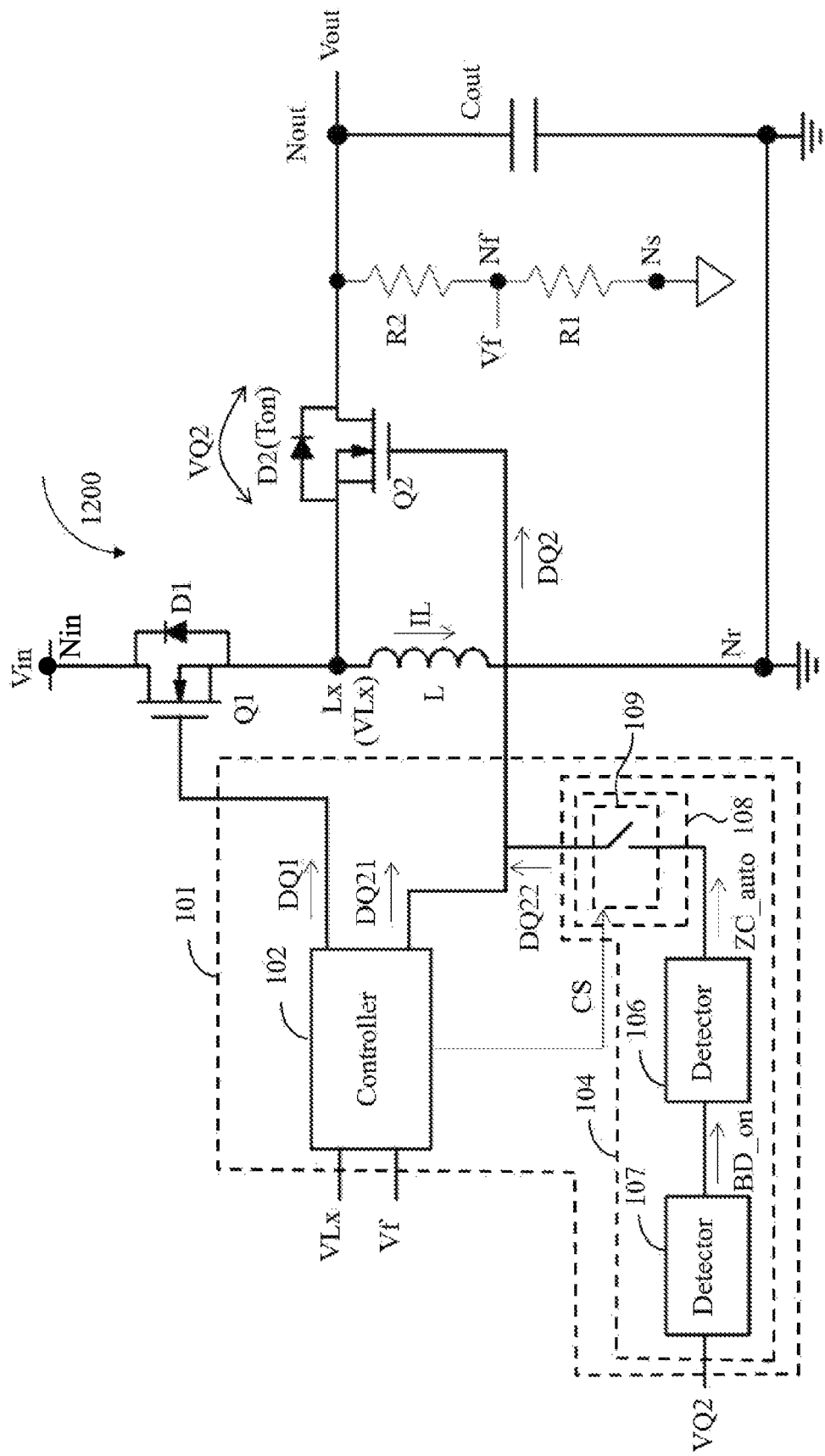
FIG. 12 illustrates a portion of an exemplary switching regulator in examples of the present disclosure.

FIG. 12 illustrates a portion of an exemplary switching regulator in examples of the present disclosure. The circuit structure of the switching regulator 1200 shown in FIG. 12 is similar to that of the switching regulator 100 shown in FIG. 1 except that the inductor L, the switch Q1 and the switch Q2 shown in FIG. 12 are coupled in a different manner to implement a buck-boost converter. In the present example, the inductor L can be coupled between the node Lx and the node Nr. The switch Q1 can be selectively coupled between the node Nin and the node Lx according to the drive signal DQ1. The switch Q2 can be selectively coupled between the node Lx and the node Nout according to the drive signal DQ2.

Figure 13:
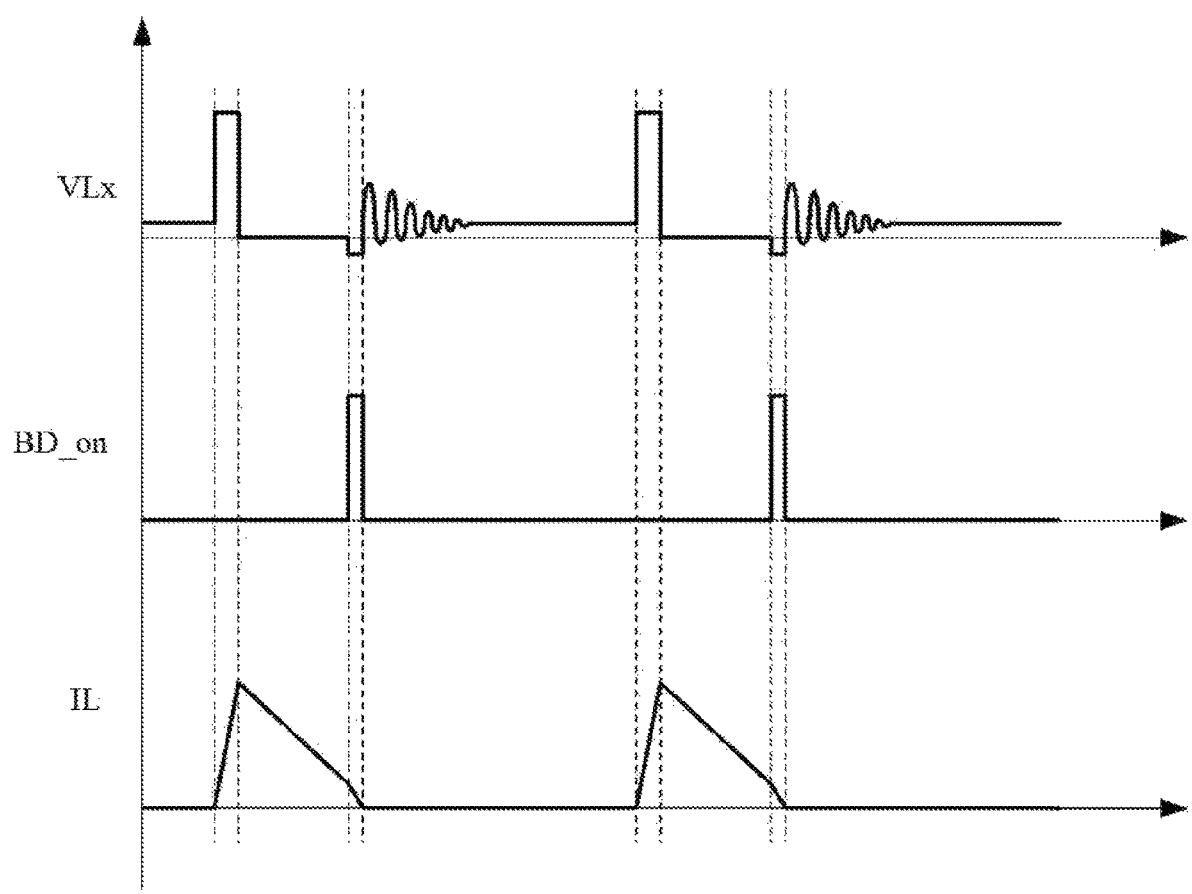
FIG. 13 illustrates signal waveforms of the voltage, the detection signal and the inductor current shown in FIG. 12 in examples of the present disclosure.

FIG. 13 illustrates signal waveforms of the voltage VLx, the detection signal BD_on and the inductor current IL shown in FIG. 12 in examples of the present disclosure. In the present example, the detector 106 shown in FIG. 12 can be implemented by the detector 306 shown in FIG. 3. The switching regulator 1200 shown in FIG. 12 may operate in a mode, where the drive signal DQ22 serves as the drive signal DQ2 to control the switch Q2, to produce the signal waveforms shown in FIG. 13. By adjusting a diode conduction time to approach or equal a time threshold, the detection circuit 104 can turn off the switch Q2 at a suitable or optimal time, which can reduce conduction loss in the diode D2. As those skilled in the art can readily understand operation of the switching regulator 1200 shown in FIG. 12 and generation of the signal waveforms shown in FIG. 13 after reading the above paragraphs directed to FIG. 1 to FIG. 9, further description is omitted here for brevity.

In examples of the present disclosure, the auto-tuning detection scheme can be employed in boost converters having different circuit structures from that of the switching regulator 1000 shown in FIG. 10. In examples of the present disclosure, the auto-tuning detection scheme can be employed in buck-boost converters having different circuit structures from that of the switching regulator 1200 shown in FIG. 12. For example, the auto-tuning detection scheme can be employed in a flyback converter which is a buck-boost derived converter with an isolation winding.

In examples of the present disclosure, the auto-tuning detection scheme can be employed in other types of circuits, each of which includes a switch, to detect if a current flowing through the switch reaches a current threshold. Alternatively, the auto-tuning detection scheme can be used to detect if a current flowing through a node connected to the switch reaches a current threshold.

Figure 14:
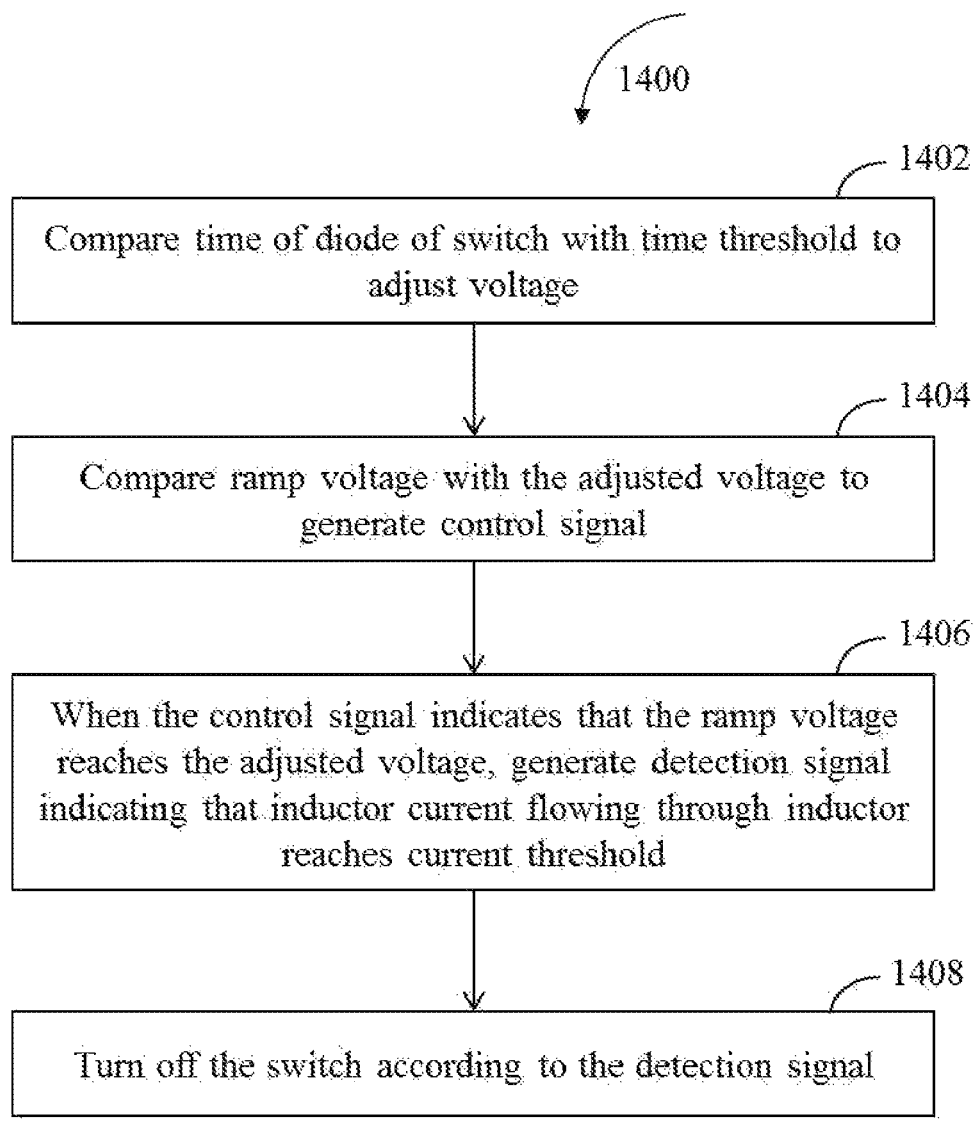
FIG. 14 is a flow chart of an exemplary control method of a switching regulator in examples of the present disclosure.

FIG. 14 is a flow chart of an exemplary control method 1400 of a switching regulator in examples of the present disclosure. The switching regulator has a switch coupled to an inductor. The control method 1400 can be employed in the switching regulators described with reference to FIG. 1 through FIG. 13. For illustrative purposes, the control method 1400 is described with reference to the switching regulator 100 shown in FIG. 1 and the detection circuit 304 shown in FIG. 3. It is worth noting that the control method 1400 can be employed in other types of circuits to detect whether a current flowing or passing through a switch reaches a current threshold, thereby controlling operation of the switch. Additionally, in examples of the present disclosure, other operations in the control method 1400 can be performed. In examples of the present disclosure, operations of the control method 1400 can be performed in a different order and/or vary.

At operation 1402, a conduction time of a body diode of the switch is compared with a time threshold to adjust a voltage. For example, the comparison circuit 310 may compare the time Ton of the diode D2 with the time threshold Tth to adjust the voltage Vc at the node Nc.

At operation 1404, a ramp voltage is compared with the adjusted voltage to generate a control signal. For example, the comparator 322 may compare the ramp voltage Vramp with the voltage Vc to generate the control signal ZC_blk.

At operation 1406, when the control signal indicates that the ramp voltage reaches the adjusted voltage, a detection signal is generated to indicate that an inductor current flowing through the inductor reaches a current threshold. For example, when the control signal ZC_blk indicates that the ramp voltage Vramp reaches the voltage Vc, the output circuit 324 may generate the detection signal ZC_auto, which can indicate that the inductor current IL flowing through the inductor L reaches a current threshold such as the current threshold Cthz shown in FIG. 8.

At operation 1408, the switch is turned off according to the detection signal. For example, the detection circuit 104 may output the drive signal DQ22 according to the detection signal ZC_auto to thereby turn off the switch Q2.

In examples of the present disclosure, at operation 1402, the voltage can be adjusted by adjusting a charge accumulated at a node. For example, when the time Ton of the diode D2 is different from the time threshold Tth, the comparison circuit 310 may adjust the voltage Vc by adjusting the charge accumulated at the node Nc.

In examples of the present disclosure, an increase in the voltage adjusted at operation 1402 can lead to a delay in a switching timing of the switch. The current threshold can be relatively close to or substantially equal to zero. For example, in the examples shown in FIG. 8 and FIG. 9, the period of time Tblk can be adjusted in response to the voltage Vc. With the use of the period of time Tblk, the switch Q2 can be turned off at a suitable or optimal time. The current threshold Cthz is closer to zero than the current threshold Cthx and is still positive.

With the use of a time threshold for a diode conduction time, the auto-tuning detection scheme can adaptively and automatically adjust a turn-on time of a switch, thereby adjusting the diode conduction time to approach or equal the time threshold in a few switching cycles. The switch can be turned off at a suitable or optimal time, thus reducing conduction loss in a diode of the switch. In addition, the auto-tuning detection scheme can be implemented as an analog control scheme, which uses a small die area or silicon area as compared with a digital control scheme.

As used herein, the terms "approaching", "approximately", and "substantially", are used to describe and account for small variations. When used in conduction with an event or circumstance, the terms can refer to instances in which the event of circumstance occurs precisely as well as instances in which the event or circumstance occurs to a close approximation. As sued herein with respect to to given value or range, the terms "approaching", "approximately", and "substantially" generally mean within ±10%, ±5%, ±1%, ±0.5%, ±0.1% or ±0.05% of the given value or range. Ranges can be expressed herein as from one endpoint to another endpoint or between two endpoints. All ranges disclosed herein are inclusive of the endpoints, unless specified otherwise.

Those of ordinary skill in the art may recognize that modifications of the embodiments disclosed herein are possible. For example, coupling means of the inductor L, the switch Q1, and the switch Q2 may vary. Other modifications may occur to those of ordinary skill in this art, and all such modifications are deemed to fall within the purview of the present invention, as defined by the claims.

The invention claimed is:

1. A detection circuit for detecting an inductor current flowing through an inductor, the inductor being coupled to a switch, the detection circuit comprising:
    a comparison circuit having a first node, the comparison circuit being configured to compare a conduction time of a diode of the switch with a time threshold to provide a first voltage at the first node; and
    a signal generating circuit coupled to the first node, the signal generating circuit being configured to output a first detection signal according to the first voltage, the first detection signal indicating whether the inductor current flowing through the inductor reaches a first current threshold.

2. The detection circuit of claim 1, wherein when the conduction time of the diode is equal to the time threshold, the first detection signal outputted from the signal generating circuit changes from a signal level to an other signal level different from the signal level at a time at which the inductor current reaches the first current threshold.

3. The detection circuit of claim 2, wherein when the conduction time of the diode is greater than the time threshold, the signal generating circuit is configured to delay a time at which the first detection signal changes from the signal level to the other signal level according to the first voltage.

4. The detection circuit of claim 2, wherein when the conduction time of the diode is less than the time threshold, the signal generating circuit is configured to advance a time at which the first detection signal changes from the signal level to the other signal level according to the first voltage.

5. The detection circuit of claim 1, wherein the comparison circuit comprises:
    a charge storage device coupled to the first node; and
    a processing circuit coupled to the charge storage device through the first node, the processing circuit being configured to compare the conduction time of the diode with the time threshold to adjust a charge stored in the charge storage device, and accordingly adjust the first voltage at the first node.

6. The detection circuit of claim 5, wherein the processing circuit comprises:
    a charging circuit coupled to the first node, the charging circuit being configured to, when the conduction time of the diode is greater than the time threshold, charge the charge storage device to increase the first voltage at the first node; and
    a discharging circuit coupled to the first node, the discharging circuit being configured to, when the conduction time of the diode is less than the time threshold, discharge the charge storage device to decrease the first voltage at the first node.

7. The detection circuit of claim 6, wherein the charging circuit comprises:
    a comparator, configured to compare the conduction time of the diode with the time threshold to generate a comparison result; and
    a current source coupled to the comparator, the current source being configure to, when the comparison result indicates that the conduction time of the diode is greater than the time threshold, provide a current to the charge storage device.

8. The detection circuit of claim 6, wherein the discharging circuit comprises:
    a comparator, configured to compare the conduction time of the diode with the time threshold to generate a comparison result; and
    a current sink coupled to the comparator, the current sink being configure to, when the comparison result indicates that the conduction time of the diode is less than the time threshold, draw a current from the charge storage device.

9. The detection circuit of claim 1, wherein the signal generating circuit comprises:
    a comparator coupled to the first node, the comparator being configured to compare a ramp voltage with the first voltage to generate a control signal; and
    an output circuit coupled to the comparator, the output circuit being configured to output the first detection signal according to the control signal, wherein before the control signal indicates that the ramp voltage reaches the first voltage, the first detection signal has a signal level; when the control signal indicates that the ramp voltage reaches the first voltage, the first detection signal has an other signal level different from the signal level.

10. The detection circuit of claim 9, wherein the output circuit is configured to selectively use a second detection signal as the first detection signal according to the control signal; the second detection signal changes from the signal level to the other signal level at a time at which the inductor current decreases to a second current threshold higher than the first current threshold; when the control signal indicates that the ramp voltage reaches the first voltage, the output circuit is configured to use the second detection signal as the first detection signal.

11. The detection circuit of claim 10, wherein the ramp voltage starts to rise at the time at which the inductor current reaches the second current threshold.

12. The detection circuit of claim 1, further comprising:
    a detector coupled between a second node and the comparison circuit, the second node being coupled to the switch and the inductor, the detector being configured to sense a second voltage at the second node to output a second detection signal to the comparison circuit, the second detection signal indicating the conduction time of the diode.

13. A switching regulator, comprising:
a switch coupled to an inductor, the switch being controlled by a drive signal; and
a detection circuit coupled to the switch, the detection circuit being configured to generate the drive signal, the detection circuit comprising:
a comparison circuit having a first node, the comparison circuit being configured to compare a conduction time of a diode of the switch with a time threshold to selectively adjust a charge accumulated at the first node; and
a signal generating circuit coupled to the first node, the signal generating circuit being configured to output a first detection signal according to a first voltage at the first node, the first detection signal indicating whether an inductor current flowing through the inductor reaches a current threshold; and
a drive circuit, coupled to the switch and the signal generating circuit, wherein when the first detection signal indicates that the inductor current reaches the current threshold, the drive circuit is configured to output the drive signal according to the first detection signal, and turn off the switch according to the drive signal.

14. The switching regulator of claim 13, wherein when the conduction time of the diode is equal to the time threshold, the first detection signal outputted from the signal generating circuit toggles at a time at which the inductor current reaches the current threshold.

15. The switching regulator of claim 14, wherein when the conduction time of the diode is greater than the time threshold, the comparison circuit is configured to adjust the charge accumulated at the first node, and the signal generating circuit is configured to delay toggling of the first detection signal according to the first voltage; the drive circuit is configured to extend a turn-on time of the switch according to the first detection signal.

16. The switching regulator of claim 14, wherein when the conduction time of the diode is less than the time threshold, the comparison circuit is configured to adjust the charge accumulated at the first node, and the signal generating circuit is configured to toggle the first detection signal in advance according to the first voltage; the drive circuit is configured to shorten a turn-on time of the switch according to the first detection signal.

17. The switching regulator of claim 13, wherein the comparison circuit comprises:
a charge storage device coupled to the first node;
a charging circuit coupled to the first node, the charging circuit being configured to, when the conduction time of the diode is greater than the time threshold, charge the charge storage device to increase the first voltage at the first node; and
a discharging circuit coupled to the first node, the discharging circuit being configured to, when the conduction time of the diode is less than the time threshold, discharge the charge storage device to decrease the first voltage at the first node.

18. The switching regulator of claim 13, wherein the signal generating circuit comprises:
a comparator coupled to the first node, the comparator being configured to compare a ramp voltage with the first voltage to generate a control signal; and
an output circuit coupled to the comparator, the output circuit being configured to output the first detection signal according to the control signal, wherein before the control signal indicates that the ramp voltage reaches the first voltage, the first detection signal has a signal level; when the control signal indicates that the ramp voltage reaches the first voltage, the first detection signal has another signal level different from the signal level.

19. The switching regulator of claim 13, wherein the comparison circuit is configured to receive a second detection signal indicating the conduction time of the diode; the detection circuit further comprises:
a detector coupled between a second node and the comparison circuit, the second node being coupled to the switch and the inductor, the detector being configured to sense a second voltage at the second node to generate the second detection signal.

20. A control method of a switching regulator, the switching regulator having a switch coupled to an inductor, the control method comprising:
comparing a conduction time of a body diode of the switch with a time threshold to adjust a voltage generating an adjusted voltage;
comparing a ramp voltage with the adjusted voltage to generate a control signal;
when the control signal indicates that the ramp voltage reaches the adjusted voltage, generating a detection signal indicating that an inductor current flowing through the inductor reaches a current threshold; and
turning off the switch according to the detection signal.

* * * * *